March 24, 1964  W. H. GREATBATCH, JR  3,126,544
METHOD OF DECEPTION FOR AN AIRCRAFT
Filed March 17, 1961

INVENTOR.
WILLIAM H. GREATBATCH, JR.
BY
ATTORNEYS

United States Patent Office 3,126,544
Patented Mar. 24, 1964

3,126,544
METHOD OF DECEPTION FOR AN AIRCRAFT
William H. Greatbatch, Jr., 7344 N. Shadeland Ave.,
Indianapolis 26, Ind.
Filed Mar. 17, 1961, Ser. No. 96,616
10 Claims. (Cl. 343—18)
(Granted under Title 35, U.S. Code (1952), sec. 266)

The invention described herein may be manufactured and used by or for the Government of the United States of America for governmental purposes without the payment of any royalties thereon or therefor.

The present invention relates to a countermeasure technique for protecting an airplane from an enemy attack and more particularly to a method of protecting an airplane by deceiving an enemy missile, or other weapon, into tracking a decoy target.

Various systems are being employed by enemy weapons in tracking or following military aircraft. In addition to the various active radar systems employed, it is known that many missiles and rockets track a target by homing on radio frequency energy radiated by a target. In order to prevent deception, a missile or rocket may have more than one mode of tracking and may periodically switch modes.

Various methods and devices are being used as countermeasures to prevent an enemy missile from either tracking or hitting a military aircraft. One such device employed is shown in U.S. Patent 2,898,588, which provides an attack deviation device. This attack deviation device consists of a target, to be towed behind an aircraft, that will reflect radar signals to a greater degree than the towing aircraft and cause automatic follow-up ground and aerial artillery to track the trailed target, in an effort to destroy the same, rather than the aircraft. This system has a disadvantage however, in that the towed target materially affects the speed of the towing aircraft as additional drag is encountered.

Another countermeasure system is shown in U.S. Patent 2,957,417, which relates to a missile decoy that is launched from the rear of an airplane with the intended purpose of intercepting an enemy missile in flight. A parabolic shaped shroud is provided at the motor end of the missile so that radiation from the motor is directed in a forward direction. The main disadvantage of launching this decoy from the rear is that the greatest percentage of the radiation from the decoy is being directed away from the interceptor while the radiation from the airplane to be protected is directed toward the intercepting missile.

The present invention relates to a countermeasure system that comprises launching a decoy target in a forward direction, or at some other optimum angle, and then radiating the decoy target with RF energy. Actually to enhance the deception, the RF energy that was being radiated for radar search, navigation, and other tactical operations can be switched to a special highly directional antenna and directed at the decoy. Thus the intercepting missile will be deceived into tracking or following the decoy which is slowly departing from the flight path of the parent aircraft to be protected.

It is therefore a general object of the present invention to provide a decoy target that will attract the attention of an intercepting missile and deceive the missile into tracking or following the decoy target, rather than the aircraft that launched the decoy target.

Another object of the present invention is to provide a countermeasure system of prootecting an aircraft by launching a decoy target and then illuminating said decoy target with RF energy.

Other objects and advantages of the present invention will be readily appreciated as the present invention will be readily appreciated as the same becomes better understood by reference to the following detailed description when considered in connection with the accompanying drawing wherein.

Figure 1:
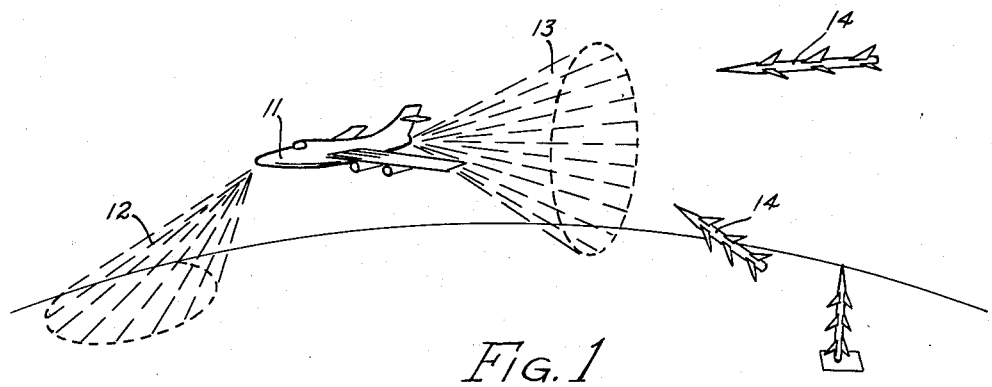
FIG. 1 is a schematic diagram showing radiation patterns emanating from an aircraft.

Referring now to the drawing, there is shown a military aircraft 11, such as a bomber, that is radiating RF energy in the forms of patterns 12 and 13. Interceptors 14, which might be launched either from the air, or from a ground station, frequently do use a tracking system that detects radio frequency energy and home on this energy. Quite frequently an intercept system will employ both an active radar system and a system that homes on radio frequency energy, with the latter mode being employed whenever radio frequency energy is being emitted, as radar systems are susceptible to jamming.

Figure 2:
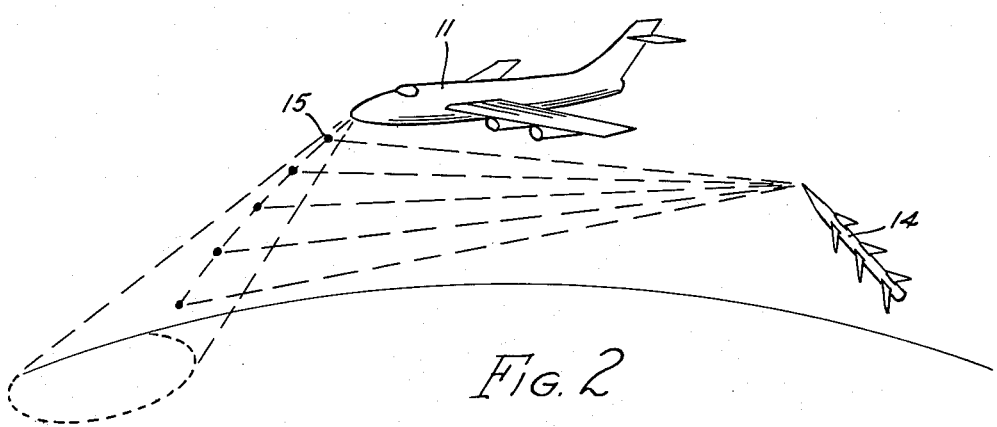
FIG. 2 is a schematic diagram showing the operation of the system of the present invention.

Referring particularly to FIG. 2 of the drawing, there is shown an interceptor 14, such as a missile, in pursuit of a military aircraft 11. At an opportune time, a decoy target 15 is launched in a direction in which the aircraft 11 is traveling. Shortly after launching of the decoy target 15, the radio frequency energy which is being abundantly radiated from aircraft 11, as shown by patterns 12 and 13 in FIG. 1, is cut off and directed onto the decoy target 15 by means of a highly directional antenna. Thus the signal being tracked by the interceptor 14 is shifted from the aircraft 11 to a new center of radiation manifested by the decoy target 15. The gradual but effective shift of the center of radiation appears to the homing system of the interceptor 14, as though the aircraft is executing a conventional evasive maneuver.

Figure 3:
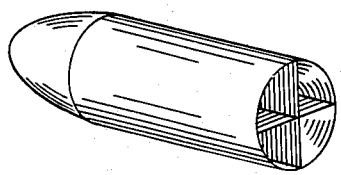
FIG. 3 is a perspective view showing one type of decoy being used in the present invention.
Figure 4:
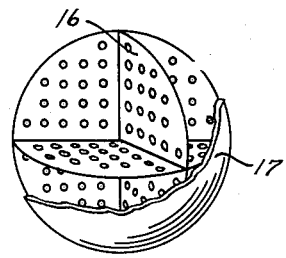
FIG. 4 is a perspective view partially broken away showing another type of decoy adaptable for use in the present invention.
Figure 5:
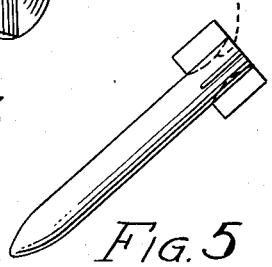
FIGURE 5 is a top plan view of a projectile type decoy having rocket propulsion.

The shape of the decoy target 15 might be one of several different configurations. A projectile type decoy is shown in FIG. 3 of the drawing that can be lanched by any conventional means, such as by compressed gas, air, or a reduced power change. FIG. 4 shows a spherical shaped decoy that is provided with a plurality of target plates 16 that will reflect the energy beamed from the aircraft 11. A skin 17 is provided around plates 16 to reduce drag and facilitate flight. FIGURE 5 shows a self-propelled decoy target having a nozzle 18 which provides a rocket type of propulsion, well known in the art.

While the manner of propulsion of the decoy targets 15 is relatively unimportant, it is desirable that the velocity imparted to the decoy targets be positive relatively to the aircraft 11. The magnitude of the velocity should not be too great, as the best deception will be made if it appears to the homing system of the interceptor 14 that the aircraft is undertaking a conventional evasive maneuver. Also, the flight path of the decoy target 15 should break away from the future flight path of aircraft 11 to provide the required geometric separation. If the separation is too abrupt, it is possible that a range rate detecting circuit in the interceptor 14 could detect the discontinuity of the "target jump" from the aircraft 11 to the decoy target, and thus not be deceived into switching targets.

As it is probable that the interceptor 14 will be equipped with an active radar mode, as well as a homing system, after the decoy target 15 is launched, the present invention contemplates that chaff will be dispensed from aircraft 11. Thus as the decoy target 15 moves away from aircraft 11, the amount of radio frequency energy that will be reflected from the decoy target 15 will decrease until it reaches zero. Also, an effective operation would be to suddenly cut off the radio frequency energy being directed to the decoy target 15, and thus the interceptor 14 would be tracking a false signal which is suddenly extinguished. When the interceptor "loses" the decoy target 15, it is highly probable that the interceptor 14 will switch to its radar mode, however, as chaff has been dispensed in the meantime, a fix will not be obtained on aircraft 11.

In the event that the interceptor 14 might be operating on its radar mode during pursuit, a dispensing of chaff at the time of launching the decoy target 15 would cause the interceptor 14 to switch to a mode that homes on radio frequency energy and thus pick up the decoy target 15 which is being illuminated with radio frequency energy from aircraft 11.

It can thus be seen that the launching of a decoy target and then illuminating this decoy target with radio frequency energy can be highly effective in deceiving an enemy interceptor into following the decoy target. Also, the timely dispensing of chaff, in conjunction with the launching of a decoy target can be instrumental in getting an interceptor to change from a radar mode to a homing system that will track the decoy target being illuminated by radio frequency energy from a parent aircraft.

Obviously many modifications and variations of the present invention are possible in the light of the above teachings. It is therefore to be understood, that within the scope of the appended claims, the invention may be practiced otherwise than as specifically described.

What is claimed is:

1. A method of deceiving an interceptor during flight comprising: launching a decoy target from an aircraft being intercepted, and then directing radio frequency energy from said aircraft to said decoy target whereby said interceptor is deceived into following said decoy target.

2. A method of deceiving an interceptor during flight comprising: launching from an aircraft a decoy target in a forward direction relative to said aircraft, and then directing radio frequency energy from an antenna on said aircraft to said decoy target whereby said interceptor is deceived into following said decoy target.

3. A method of deceiving an interceptor during flight as set forth in claim 2 wherein said decoy target is spherical in shape and comprised of a plurality of energy reflective plates.

4. A method of deceiving an interceptor during flight as set forth in claim 2 wherein said decoy target is self-propelled.

5. A method of deceiving an interceptor during flight comprising: launching from an aircraft a decoy target in a forward direction relative to said aircraft, next switching the radio frequency energy being normally transmitted to an antenna on said aircraft, and then directing said radio frequency energy onto said decoy target whereby said interceptor is deceived into following said decoy target.

6. A method of deceiving an interceptor during flight as set forth in claim 5 wherein said decoy target is spherical in shape and comprised of a plurality of energy reflective plates.

7. A method of deceiving an interceptor during flight as set forth in claim 5 wherein said decoy target is self-propelled.

8. A deception method for an aircraft being pursued by an interceptor comprising: first launching a decoy target from said aircraft, next switching the radio frequency energy being normally transmitted to an antenna on said aircraft, then directing said radio frequency energy onto said decoy target whereby said interceptor is deceived into following said decoy target, and then suddenly cutting off said energy being directed onto said decoy target whereby said interceptor is last tracking a false signal.

9. A deception method for an aircraft as set forth in claim 8 wherein said decoy target is spherical in shape and comprised of a plurality of energy reflective plates.

10. A deception method for an aircraft as set forth in claim 8 wherein said decoy target is self-propelled.

No references cited.